United States Patent [19]

Kobunaya et al.

[11] Patent Number: 5,563,854
[45] Date of Patent: Oct. 8, 1996

[54] OPTICAL INFORMATION ACCESSING SYSTEM CAPABLE OF GENERATING ONE SECTOR INITIATION SIGNAL FOR EACH SECTOR

[75] Inventors: Hideki Kobunaya, Tokyo; Yutaka Ishikawa; Yoshimori Yamasaki, both of Kanagawa; Takayoshi Chiba, Tokyo, all of Japan

[73] Assignee: NEC Corporation, Japan

[21] Appl. No.: 279,343

[22] Filed: Jul. 22, 1994

[30] Foreign Application Priority Data

Jul. 23, 1993 [JP] Japan .................................. 5-202028

[51] Int. Cl.⁶ .......................... G11B 17/22; G11B 3/90
[52] U.S. Cl. ...................... 369/32; 369/48; 369/58
[58] Field of Search ........................ 369/13, 58, 32, 369/47, 48, 54, 124; 360/51, 53

[56] References Cited

U.S. PATENT DOCUMENTS

| | | | |
|---|---|---|---|
| 5,083,303 | 1/1992 | Yanagida et al. | 369/48 |
| 5,148,416 | 9/1992 | Hoshino et al. | 369/32 |
| 5,202,877 | 4/1993 | Yanagida | 369/58 |
| 5,327,300 | 7/1994 | Satomura | 369/47 |
| 5,343,453 | 8/1994 | Ogino | 369/32 |
| 5,351,231 | 9/1994 | King et al. | 369/48 |
| 5,353,175 | 10/1994 | Chiba | 360/51 |

*Primary Examiner*—Georgia Y. Epps
*Assistant Examiner*—Tan Dinh
*Attorney, Agent, or Firm*—Ostrolenk, Faber, Gerb & Soffen, LLP

[57] ABSTRACT

In an optical information accessing system for an optical disk including a plurality of sectors each having sector mark, a read operation is carried out by a sector mark detection signal when this signal is generated, and is carried out by a sector mark interpolation signal when the sector mark detection signal is not generated. When the sector mark detection signal is generated, the sector mark interpolation signal is masked, while, when the sector mark interpolation signal is not masked, the sector mark detection signal is invalidated.

9 Claims, 21 Drawing Sheets

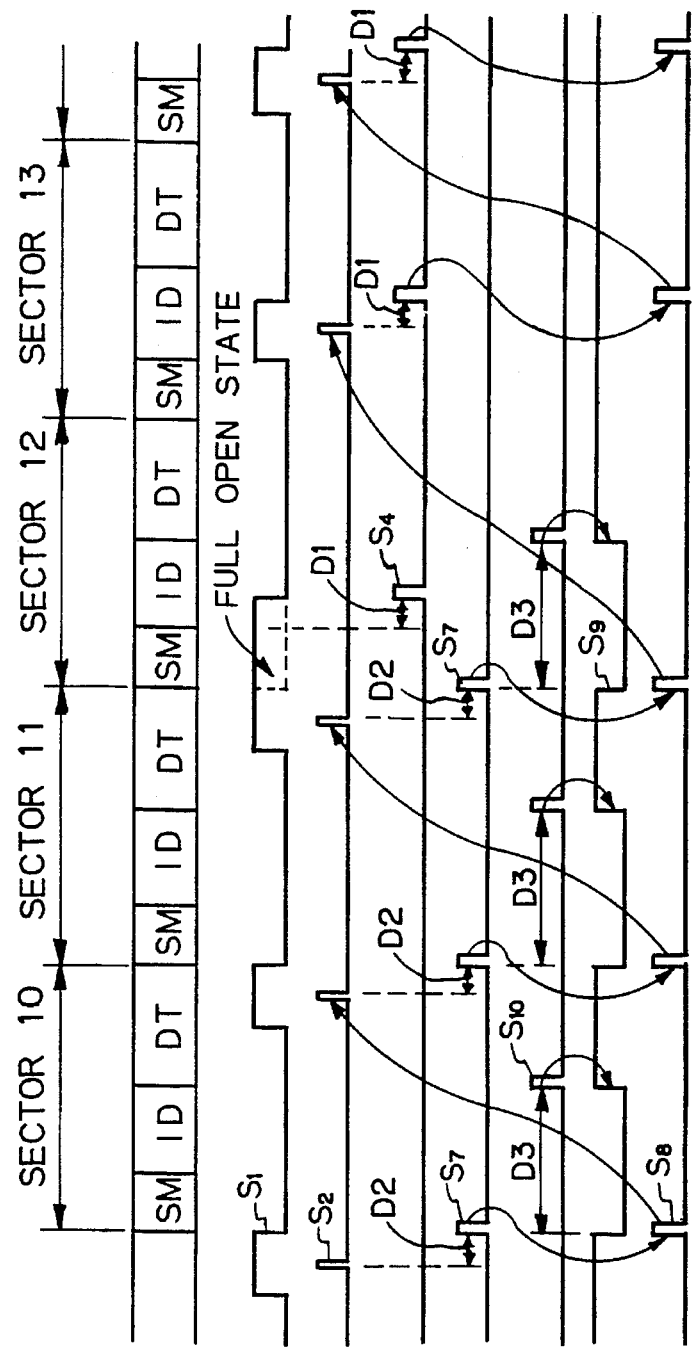

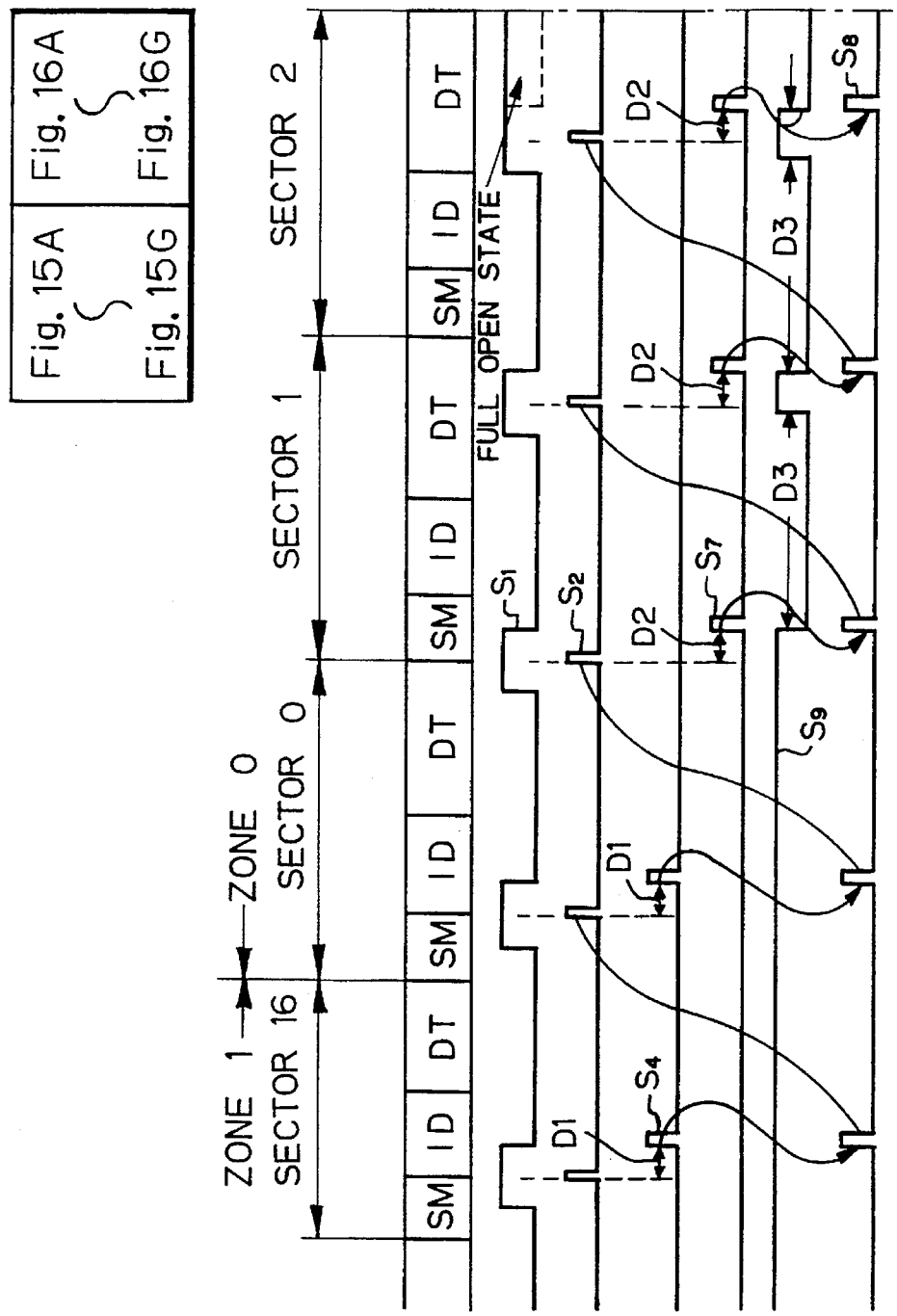

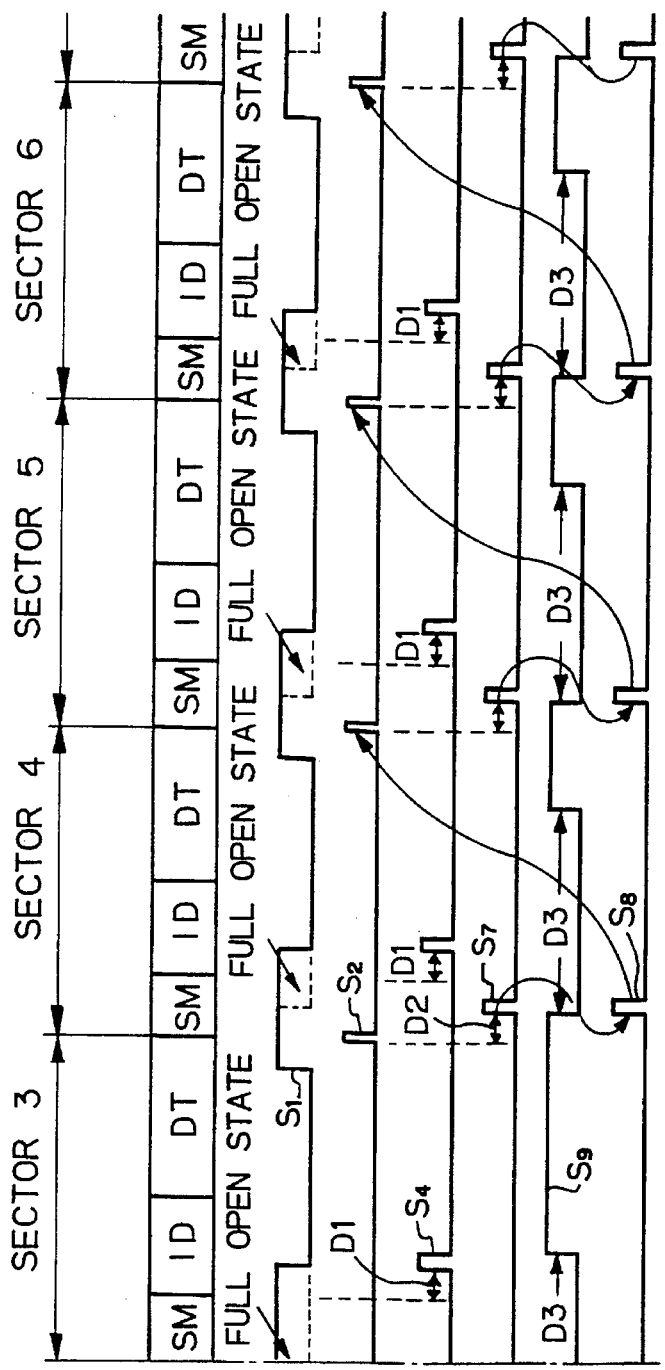

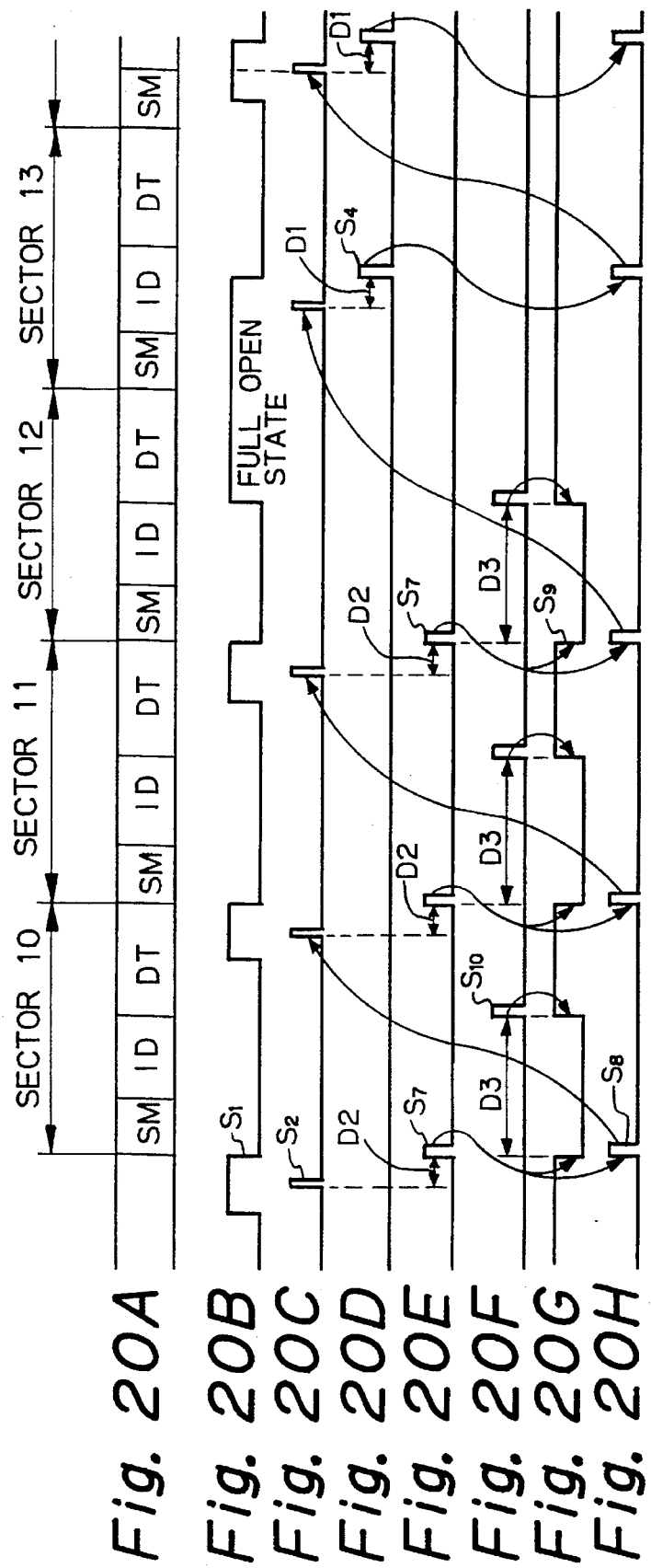

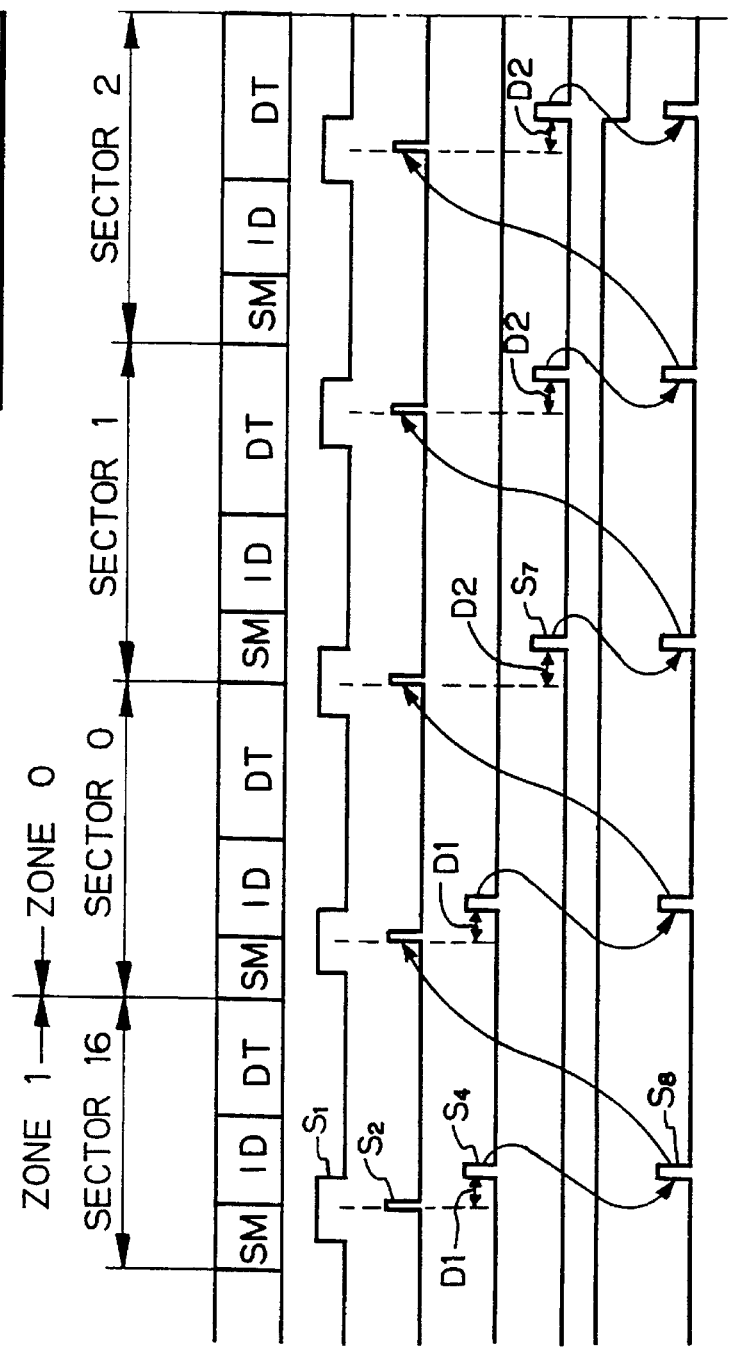

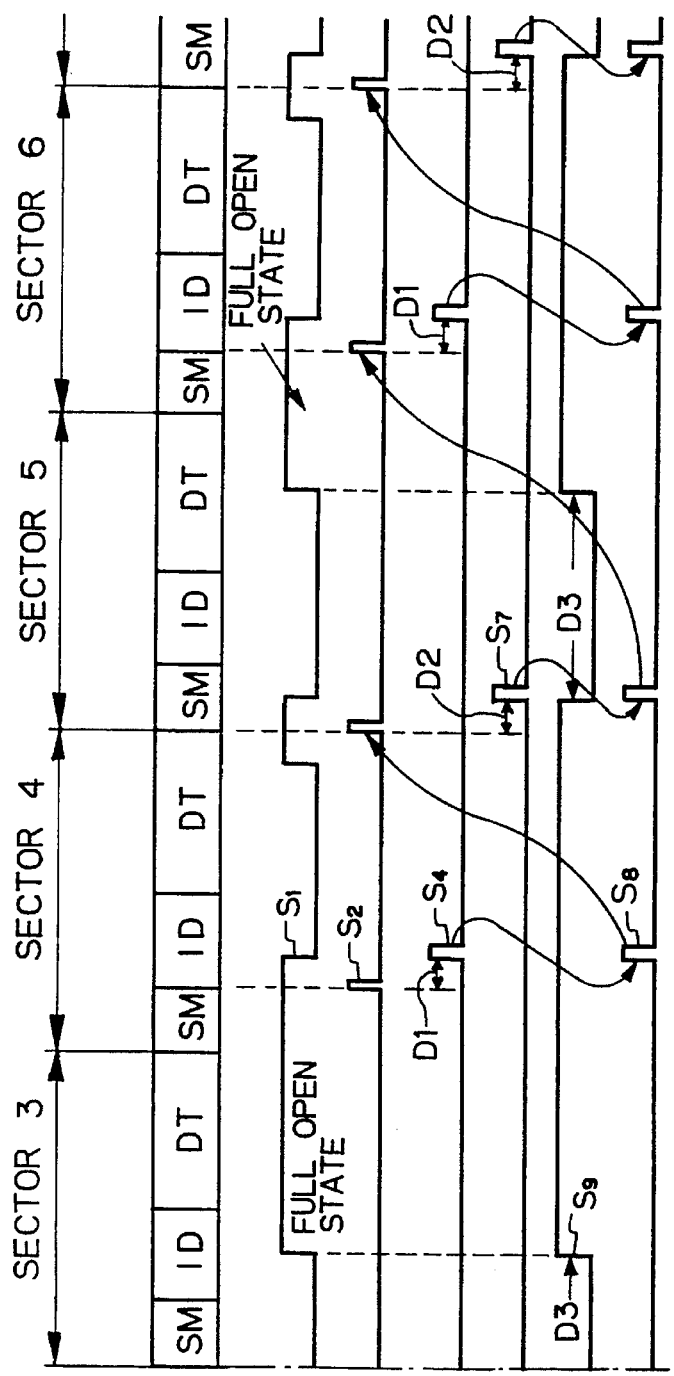

OPTICAL INFORMATION ACCESSING SYSTEM CAPABLE OF GENERATING ONE SECTOR INITIATION SIGNAL FOR EACH SECTOR

BACKGROUND OF THE INVENTION

1. Field of the Invention

The present invention relates to an optical information accessing system for an optical disk including a plurality of sectors.

2. Description of the Related Art

In an optical disk, a plurality of helical tracks are formed thereon, and each of the tracks includes a plurality of sectors each having a sector mark showing a start thereof. Therefore, in order to perform a read operation upon a specific sector, a sector mark is detected from data read from the optical disk, and a sector mark detection signal is generated within a definite time period, i.e., a so-called window defined by a window signal. Then, the read operation is carried out by the sector mark detection signal as a sector initiation signal. On the other hand, even when such a sector mark detection signal is not generated, the read operation is carried out by a sector mark interpolation signal which is generated in synchronization with sector mark detection signals which have been generated.

In the above-mentioned prior art optical disk, however, when no sector mark detection signal is generated for a long time, it is determined that the timing of detection of sector marks is remarkably shifted from the timing of the window signal, so that the window signal is always made active, i.e., in a full open state. Then, the window signal is made inactive when the next sector mark detection signal is generated. As a result, two sector initiation signals, i.e., one sector mark detection signal and one sector mark interpolation signal may be generated for one sector. In this case, for example, a jump back control is carried out by counting the sector initiation signals and therefore, the jump back control is erroneously carried out. This will be explained later in detail.

SUMMARY OF THE INVENTION

It is, therefore, an object of the present invention to provide an optical information accessing system capable of generating one sector initiation signal for one sector.

According to the present invention, in an optical information accessing system for an optical disk including a plurality of sectors each having a sector mark, a read operation is carried out by a sector mark detection signal when this signal is generated, and is carried out by a sector mark interpolation signal when the sector mark detection signal is not generated. When the sector mark detection signal is generated, the sector mark interpolation signal is masked, while when the sector mark interpolation signal is not masked, the sector mark detection signal is invalidated. Thus, two sector initiation signals, i.e., one sector mark detection signal and one sector mark interpolation signal, are never generated for one sector.

BRIEF DESCRIPTION OF THE DRAWINGS

The present invention will be more clearly understood from the description as set forth below, in comparison with the prior art, with reference to the accompanying drawings, wherein:

FIGS. 13A through 13H are timing diagrams showing the operation of the circuit of FIG. 12;

FIG. 14 is a block diagram illustrating a combination of FIGS. 15A through 15G and FIGS. 16A through 16G;

FIGS. 15A through 15G and FIGS. 16A through 16G are timing diagrams showing the operation of the circuit of FIG. 12 applied to a zone format optical disk;

FIGS. 20A through 20H are timing diagrams showing the operation of circuit of FIG. 18;

FIGS. 21 is a block diagram illustrating a combination of FIGS. 22A through 22G and FIGS. 23A through 23G; and FIGS. 22A through 22G FIGS. 23A through 23G are timing diagrams showing the operation of the circuit of FIG. 18 applied to a zone format optical disk.

DESCRIPTION OF THE PREFERRED EMBODIMENTS

Before the description of the preferred embodiments, a prior art optical information accessing system will be explained with reference to FIGS. 1, 2, 3, 4, 5, 6A through 6I, 7A through 7I, 8, 9A through 9F, and 10A through 10F.

Figure 1:
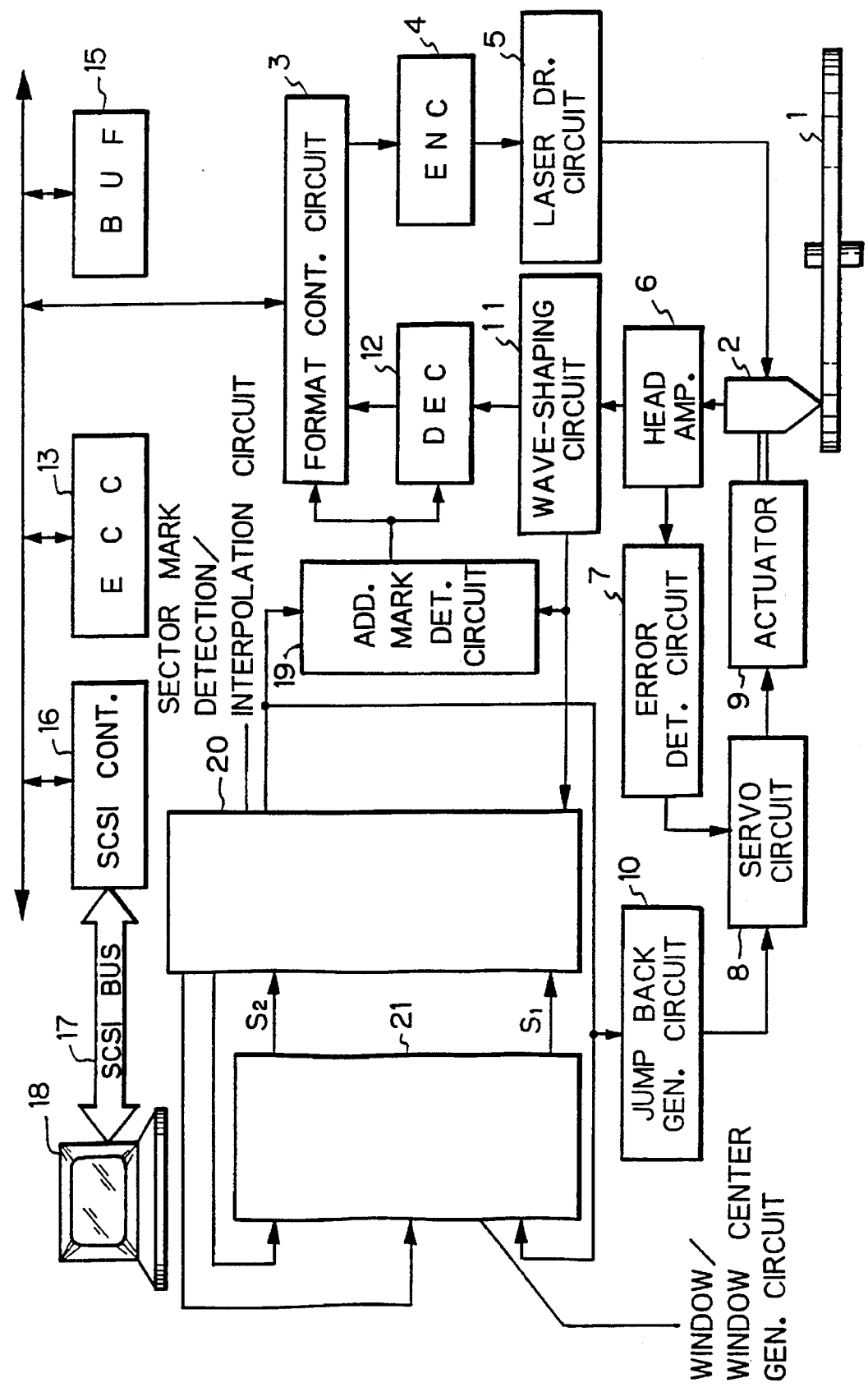
FIG. 1 is a block diagram illustrating a prior art optical information accessing system.

In FIG. 1, reference numeral 1 designates an optical disk having helical tracks, and 2 designates an optical head for accessing the optical disk 1. First, a servo system of the optical disk 1 is explained below. A format control circuit 3 operates an encoder 4 to drive a laser driving circuit 5, to thereby emit laser light from the optical head 2 to the optical disk 1. As a result, laser light emitted from the optical head 2 is reflected by the optical disk 1, and is transmitted to a head amplifier 6 which converts reflected light into an electrical signal. The electrical signal is supplied to an error detection circuit 7 for detecting a deviation of tracks on the optical disk 1. The deviation detected by the error detection circuit 7 is supplied to a servo circuit 8 which controls an actuator 9, so that the optical head 2 is always located above a track of the optical disk 1.

Figure 2:
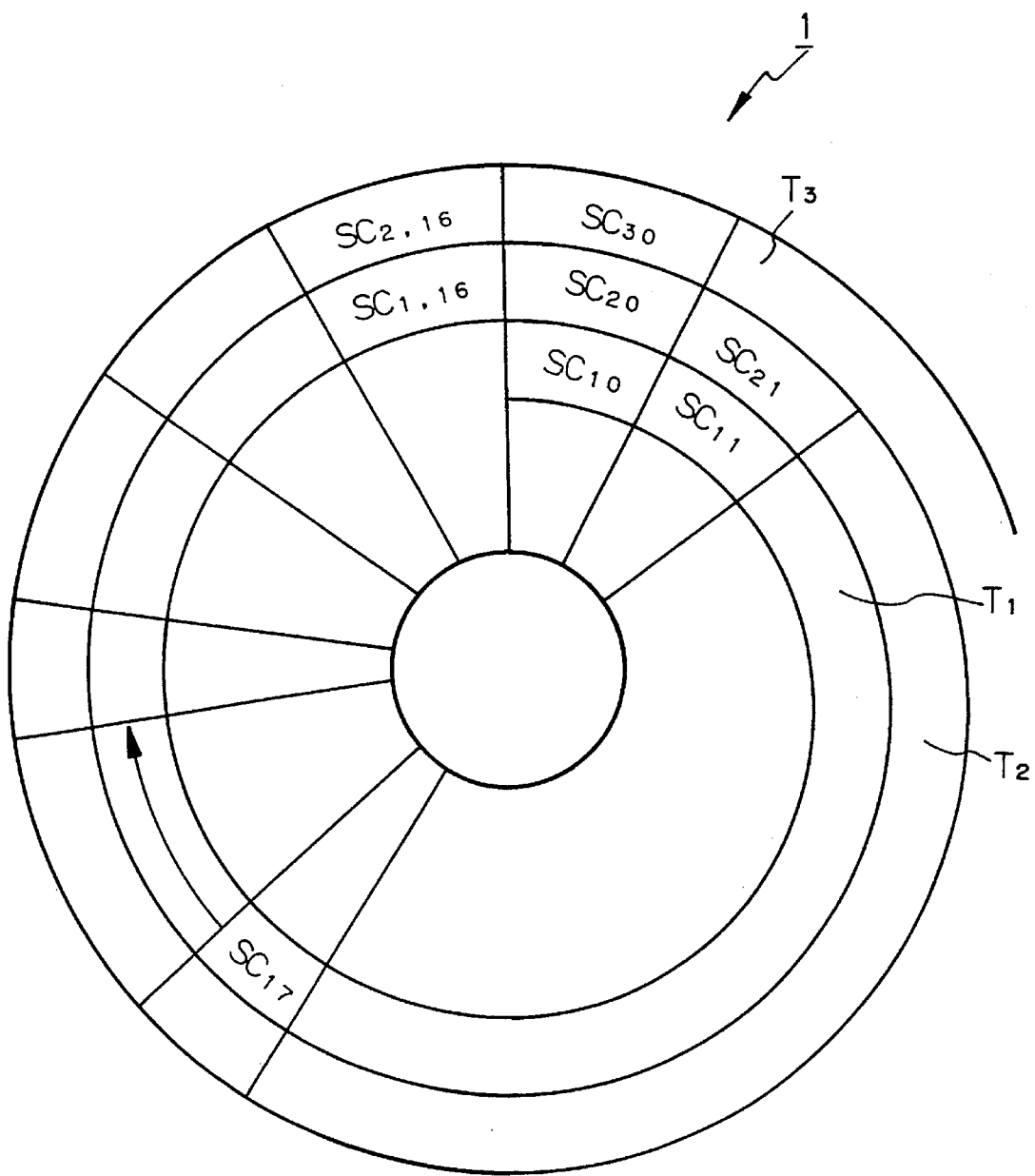
FIG. 2 is a diagram showing an example of the disk format of the optical disk of FIG. 1.

Since the optical disk 1 has a plurality of tracks $T_1, T_2, T_3, \ldots$ forming one helix as shown in FIG. 2, when the optical head 2 is expected to follow the same track, it is necessary to jump the optical head 2 back to the same track every one track revolution. For this purpose, a jump back generating circuit 10 is connected to the servo circuit 8. Note that each track, such as $T_1$, is divided into a definite number of sectors, such as $SC_{10}, S_{11}, \ldots, SC_{1,16}$.

A read system of the optical disk 1 is explained below. Data on the optical disk 1 is read by the optical head 2 and the head amplifier 6, and is supplied via a wave-shaping circuit 11 to a decoder 12. An output of the decoder 12 is supplied to the format control circuit 3.

When the format control circuit 3 detects a desired sector by identification (ID) information decoded by the decoder 2, reading of data of this desired sector is initiated. That is, read data is checked and corrected by an error correction circuit (ECC) 13, and is then stored in a buffer 15. The data stored in the buffer 15 is transmitted by a small computer system interface (SCSI) controller 16 via an SCSI bus 17 to a host computer 18.

The reading operation for the ID information by the format control circuit 3 is triggered by an address mark detection circuit 19, and simultaneously, the decoder 12 is reset by the address mark detection circuit 19.

The address mark detection circuit 19 is triggered by a sector mark detection/interpolation circuit 20 which receives a window signal $S_1$ and a window center signal $S_2$ from a window/window center generating circuit 21. The circuits 20 and 21 will be explained later in detail.

Figure 3:
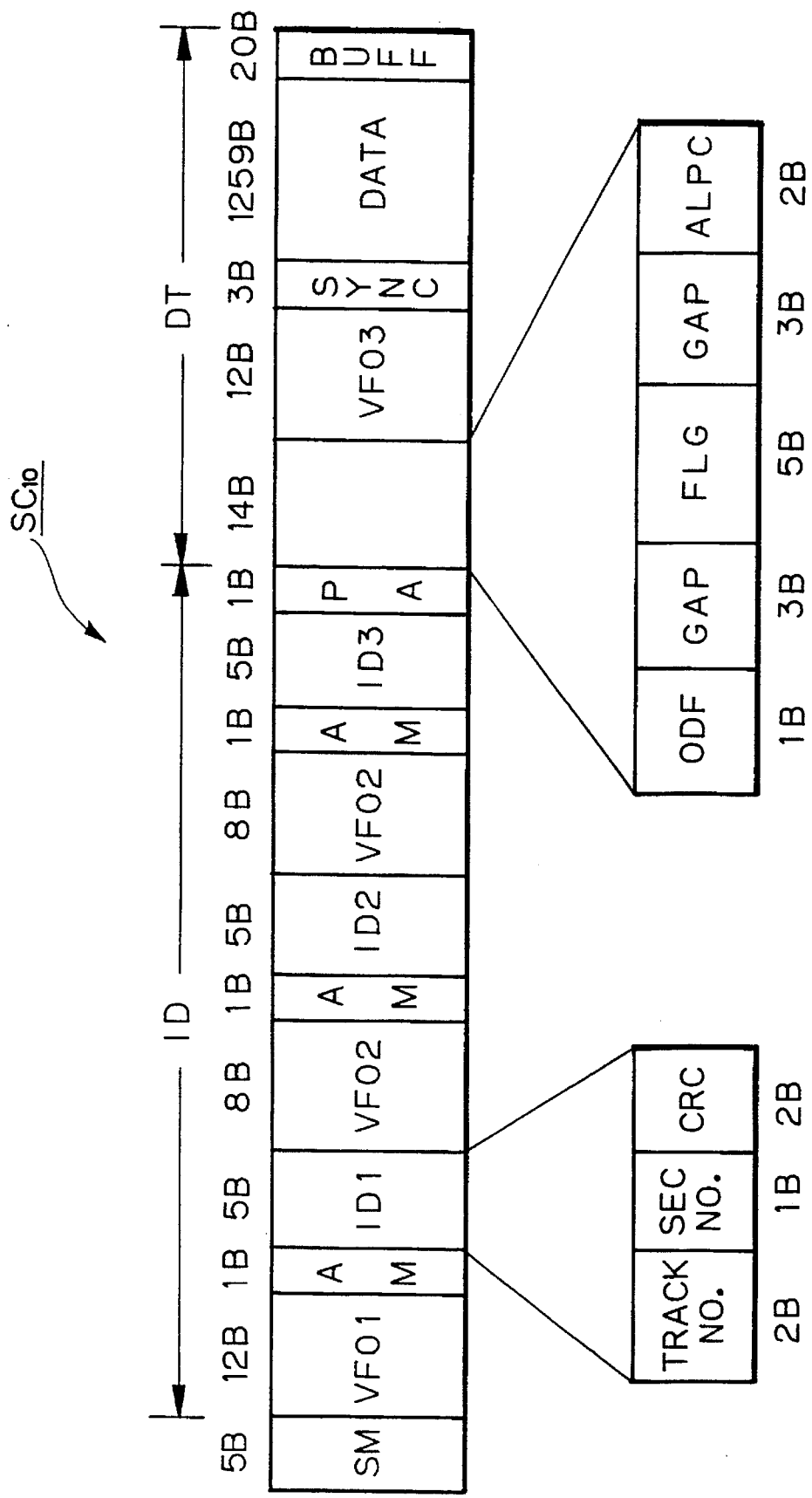
FIG. 3 is a diagram showing an example of the sector format of FIG. 2.

An example of the sector format, such as $SC_{10}$, of FIG. 2 is explained next with reference to FIG. 3. The sector format $SC_{10}$ is comprised of a sector mark SM (5 bytes), a variable frequency oscillator (VFO) data VFO1 (12 bytes), two VFO data VFO2 (8 bytes), a VFO data VFO3 (12 bytes), three address marks AM (1 bytes), three ID data ID1, ID2 and ID3 (5 bytes), a postamble (1 byte), an offset detection flag ODF (1 byte) serving as a mirror portion for correcting an offset in the servo system, two gaps GAP (3 bytes), a flag FLG (5 bytes), an auto laser power control data ALPC (2 bytes) used in a laser power test, a synchronization data SYNC (3 bytes), a data area DATA (1259 bytes), and a buffer area BUFF (20 bytes) for a margin of rotation deviation of the optical disk 1. Each of the ID data ID1, ID2 and ID3 includes a track number (2 bytes), a sector number (1 bytes) and a cyclic redundancy code (CRC) (2 bytes). Hereinafter, the data VFO1 through PA are denoted by ID, and the data ODF through BUFF are denoted by DT.

Figure 4:
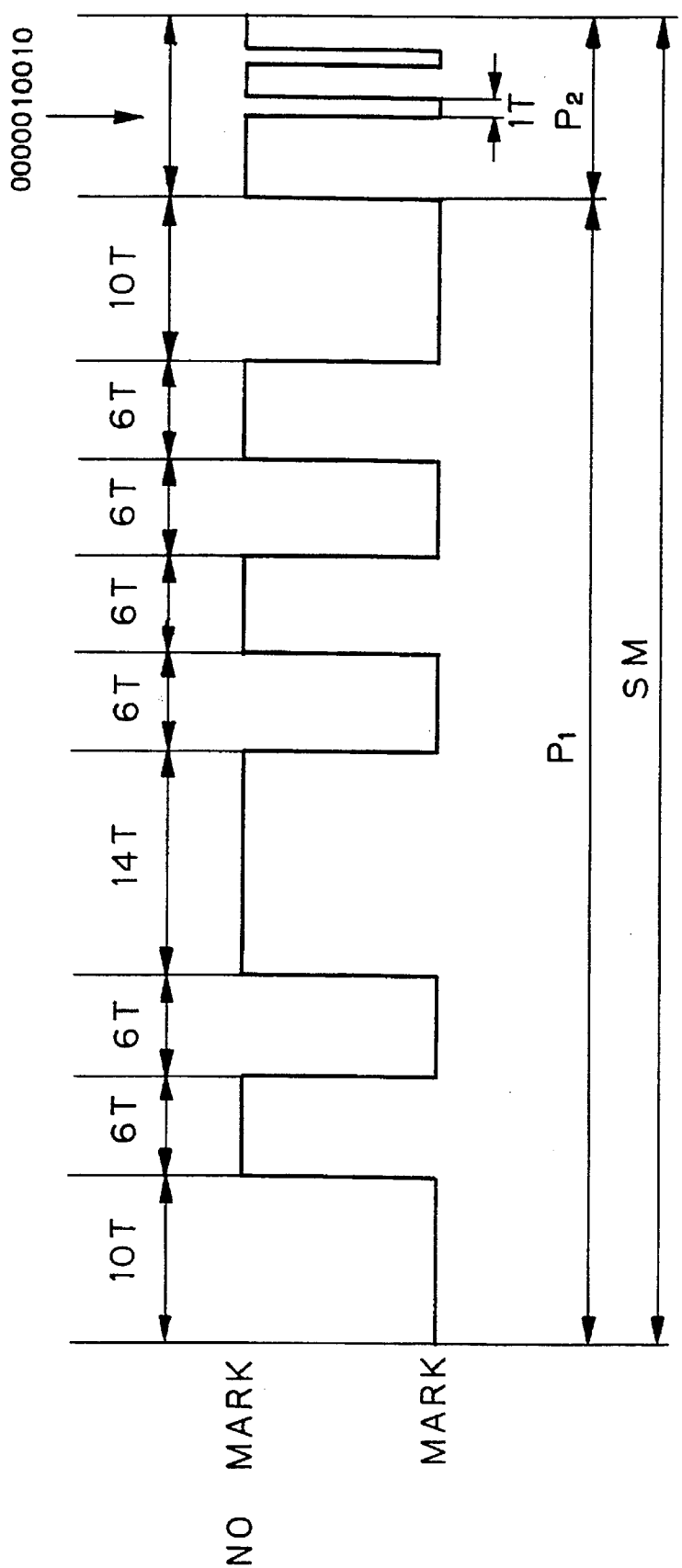
FIG. 4 is a diagram showing an example of the sector mark of FIG. 3.

The sector mark SM is comprised of a definite pattern as shown in FIG. 4. In this example, the sector mark SM is formed by a long mark pattern P1 and a short mark pattern $P_2$.

The sector mark detection/interpolation circuit 20 and the window/window center generating circuit 21 are explained next with reference to FIG. 5.

The sector mark detection/interpolation circuit 20 includes a sector mark detection circuit 2001 for detecting a sector mark SM by comparing the data from the wave-shaping circuit 11 with the definite pattern as shown in FIG. 4, an AND circuit 2002 for passing a sector mark detection signal $S_3$ under the window signal $S_1$, and a counter 2003 and a decoder 2004 serving as a delay circuit having a delay time D1. The output of the decoder 2004 is a delayed sector mark detection signal $S_4$.

Also, the sector mark detection/interpolation circuit 20 includes a flip-flop 2005 for generating a sector mark interpolation signal masking signal $S_5$. The flip-flop 2005 is set simultaneously with the rise of the window signal $S_1$ and is reset by the output of the decoder 2004, i.e., the delayed sector mark detection signal Further, the sector mark detection/interpolation circuit 20 includes a counter 2006 and a decoder 2007 for delaying the window center signal $S_2$ by a delay time D2 to generate a sector mark interpolation signal $S_6$, and further includes an AND circuit 2008 for masking the sector mark interpolation signal $S_6$ in accordance with the masking signal $S_5$. That is, when the masking signal $S_5$ is high, the output $S_7$ of the AND circuit 2008 is the sector mark interpolation signal $S_6$. Contrary to this, when the masking signal $S_5$ is low, the output $S_7$ of the AND circuit 2008 is low.

Note that each of the counters 2003 and 2006 has a start terminal S, a clock terminal C and a reset terminal R. Therefore, when the potential at the start terminal S is made high, the counter 2003 (2006) is initiated to count a clock signal CK supplied to the clock terminal C, and as a result, when the decoder 2004 (2007) determines that the value of the counter 2003 (2006) reaches the definite value D1 (D2), the decoder 2004 (2007) generates the signal $S_4$ ($S_6$) and transmits it at the reset terminal R, to thereby reset the counter 2003 (2006).

The sector mark detection signal $S_4$ and the non-masked sector mark interpolation signal $S_7$ pass through an OR circuit 2009, to thereby form a sector mark detection/interpolation signal $S_8$.

Figure 6:
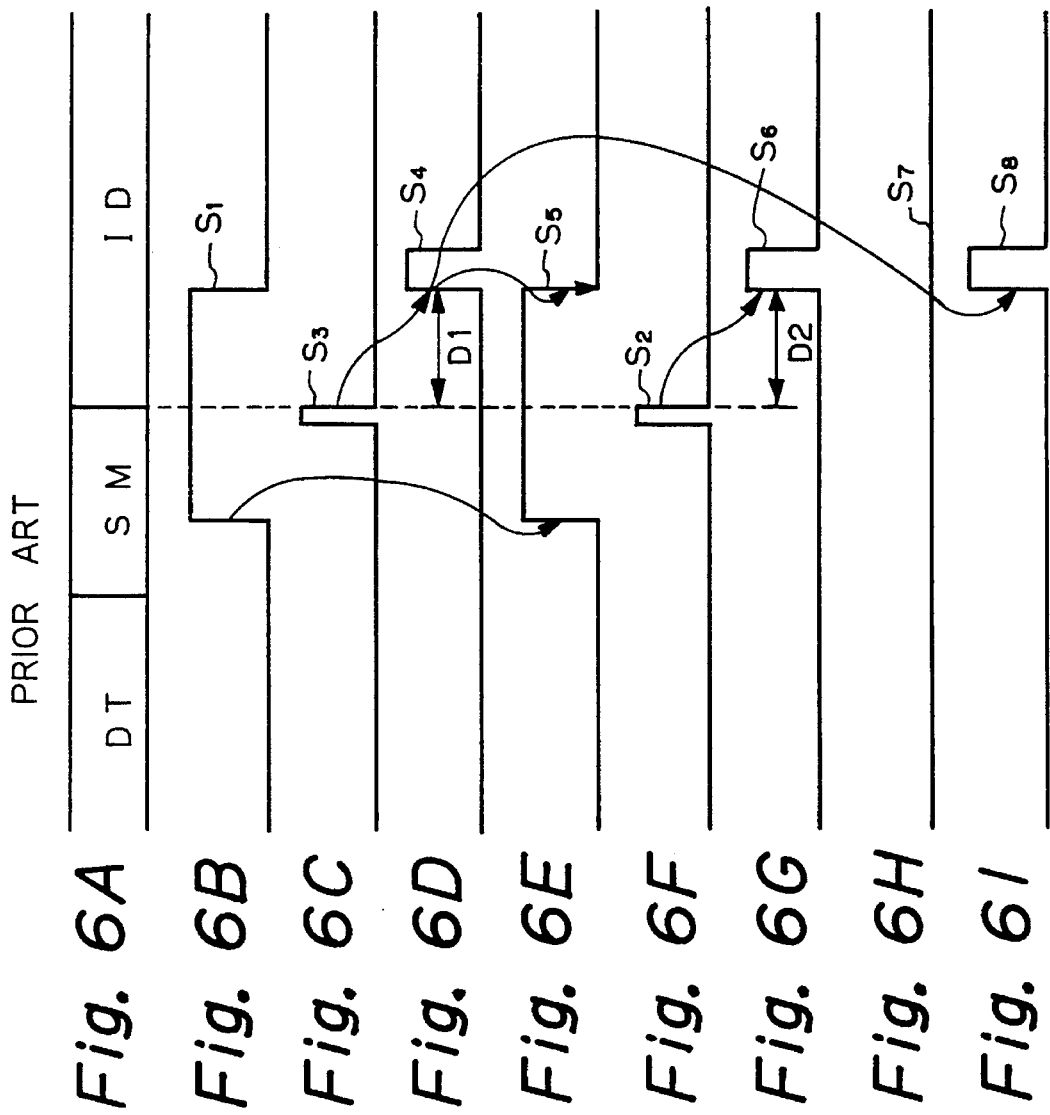
FIGS. 6A through 6I are timing diagrams showing the operation of the circuit of FIG. 5.

A case where the sector mark detection/interpolation signal $S_8$ is the delayed sector mark detection signal $S_4$, will be explained next with reference to FIGS. 6A through 6I. As shown in FIGS. 6B and 6F, the window signal $S_1$ and the window center signal $S_2$ are generated by the window/window center circuit 21 for a disk format as shown in FIG. 6A. When the sector mark detection signal $S_3$ is detected within the window signal $S_1$ as shown in FIG. 6C, the delayed sector mark detection signal $S_4$ is obtained as shown in FIG. 6D. Simultaneously, the sector mark interpolation signal masking signal $S_5$ is made active (=low). Therefore, even when the sector mark interpolation signal $S_6$ is generated as shown in FIG. 6G, this signal $S_6$ is masked, so that the output signal $S_7$ of the AND circuit 2008 is low as shown in FIG. 6H. Thus, as shown in FIG. 6I, the sector mark detection/interpolation signal $S_8$ is derived from the delayed sector mark detection signal $S_4$.

Figure 7:
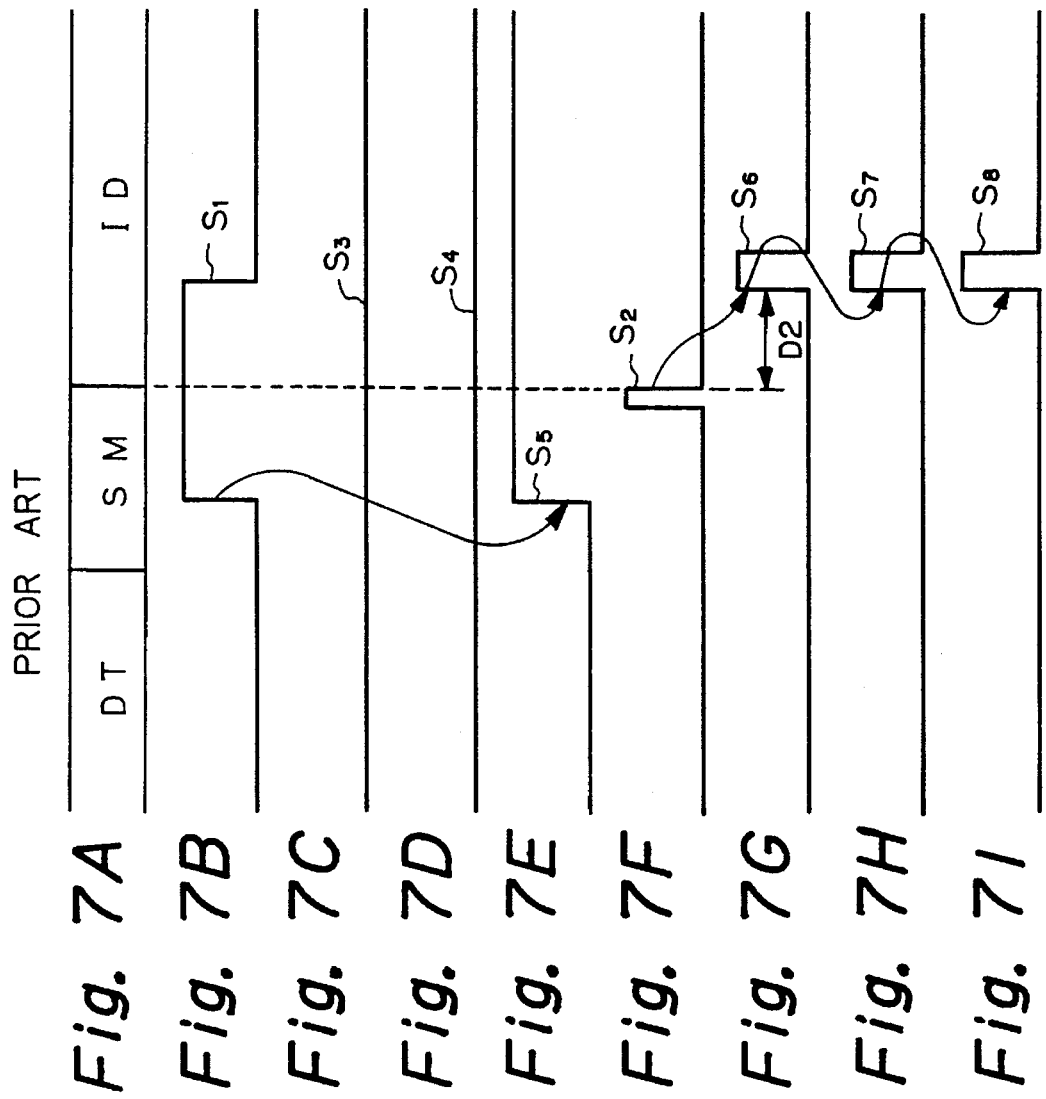
FIGS. 7A through 7I are timing diagrams showing the operation of the circuit of FIG. 5.

A case where the sector mark detection/interpolation signal $S_8$ is the sector mark interpolation signal $S_6$, will be explained with reference to FIGS. 7A through 7I. Also, as shown in FIGS. 7B and 7F, the window signal $S_1$ and the window center signal $S_2$ are generated by the window/window center circuit 21 for a disk format as shown in FIG. 7A. When the sector mark detection signal $S_3$ is not detected within the window signal $S_1$ as shown in FIG. 7C, the delayed sector mark detection signal $S_4$ is not obtained as shown in FIG. 7D. Therefore, the sector mark interpolation signal masking signal $S_5$ remains active (=high). Therefore, when the sector mark interpolation signal $S_6$ is generated as shown in FIG. 7G, this signal $S_6$ is not masked, so that the output signal $S_7$ of the AND circuit 2008 is the same as the signal $S_6$ as shown in FIG. 7H. Thus, as shown in FIG. 7I, the sector mark detection/interpolation signal $S_8$ is derived from the sector mark interpolation signal $S_6$.

Returning to FIG. 5, the window/window center generating circuit 21 includes counters 2101 and 2102, a control circuit 2103 such as a microprocessor, and a flip-flop 2104 for generating the window signal $S_1$. The counter 2101 is started by the sector mark detection/interpolation signal $S_8$ of the sector mark detection/interpolation circuit 20, and is reset by the control circuit 2103. The counter 2102 is reset by the delayed sector mark detection signal $S_4$ and counts the non-masked sector mark interpolation signal $S_7$.

The operation of the control circuit 2103 of FIG. 5 will be explained next with reference to FIG. 8, and FIGS. 9A through 9F.

At step 801, the control circuit 2103 initially sets the flip-flop 2104, thus waiting for the generation of the sector mark detection signal $S_4$ at step 802. This state is called a full open state (see FIG. 9B).

Figure 9:
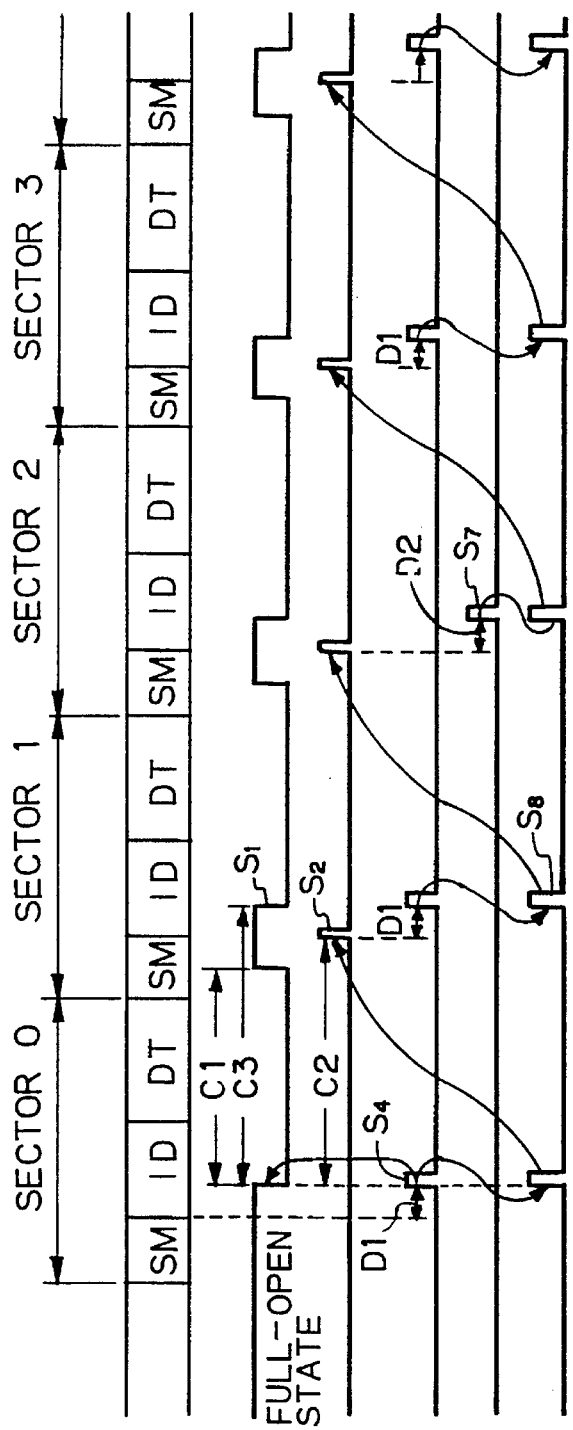
FIGS. 9A through 9F are timing diagrams showing the operation of the circuit of FIG. 5.
Figure 10:
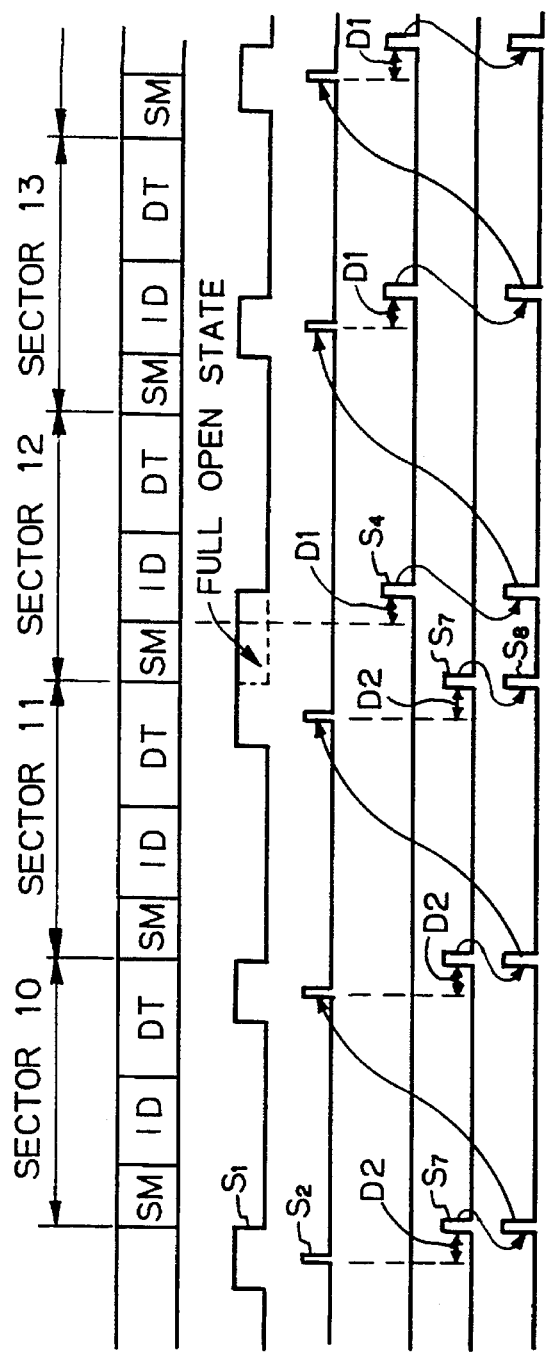
FIGS. 10A through 10F are timing diagrams showing the operation of the circuit of FIG. 5.

Then, when the sector mark detection signal $S_4$ is generated for sector 0 as shown in FIG. 9D, the control proceeds from step 802 to step 803 which resets the flip-flop 2104, thus completing the full open state.

Also, simultaneously with the generation of the sector mark detection signal $S_4$, the counter 2101 starts to count the clock signal CK.

At step 804, it is determined whether or not the value CNT1 of the counter 2101 reaches a definite value C1, at step 805, it is determined whether or not the value CNT1 of the counter 2101 reaches a definite value C2, and at step 806, it is determined whether or not the value CNT1 of the counter 2101 reaches a definite value C3. In this case (see FIGS. 9B and 9C), $$C1<C2<C3.$$

As a result, when CNT1=C1, the control proceeds from step 804 to step 807 which sets the flip-flop 2104 to activate the window signal $S_1$ (see FIG. 9B).

When CNT1=C2, the control proceeds from step 805 to step 808 which generates the window center signal $S_2$ (see FIG. 9C).

When CNT1≧C3, the control proceeds from step 806 to step 809. At step 809, it is determined whether or not the value CNT2 of the counter 2102 is not smaller than a definite value such as 3, i.e., whether or not the number of successive sector mark interpolation signal $S_6$ is not smaller than 3. If CNT2≧3, it is determined that the timing of generation of sector mark detection signals is remarkably shifted from that of the window signal and as a result, the control returns directly to step 802 without carrying out the control at step 810, thus entering a full open state. Otherwise, the control proceeds to step 810 which resets the flip-flop 2104 to deactivate the window signal $S_1$ (see FIG. 9B).

In FIGS. 9A through 9F, the sector mark detection/interpolation signal $S_8$ as shown in FIG. 9F is derived from the delayed sector mark detection signal $S_4$ as shown in FIG. 9D and the non-masked sector mark interpolation signal $S_7$ as shown in FIG. 9E, and therefore, one sector mark detection/interpolation signal $S_8$ is generated for each of the sectors 0, 1, 2, . . .

However, as shown in FIGS. 10A through 10F, immediately after three successive sector mark interpolation signals $S_7$ are generated, so that the window signal $S_1$ is not reset, i.e., the window signal $S_1$ enters a full open state, the sector mark detection signal $S_7$ may be generated. In this case, the sector mark detection/interpolation signal $S_8$ is generated twice for one sector, such as sector 12.

As stated above, every time the jump back generating circuit 10 of FIG. 1 counts a definite number of sector mark detection/interpolation signals $S_8$ such as 17 sector mark detection/interpolation signals $S_8$, the jump back generating circuit 10 generates a jump back signal. Therefore, if two sector mark detection/interpolation signals $S_8$ are generated for one sector, the jump back generating circuit 10 may be erroneously operated.

Figure 11:
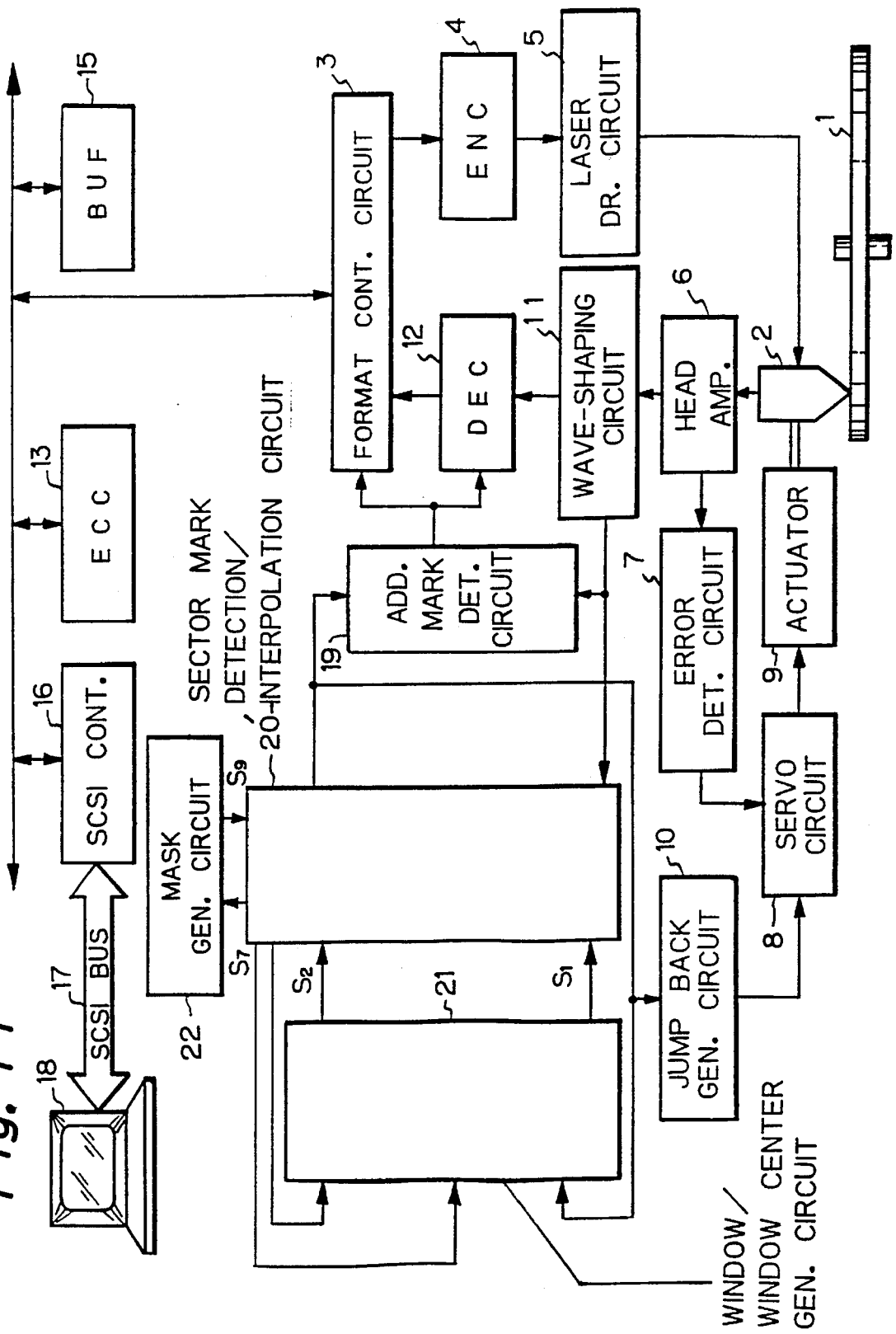
FIG. 11 is a block diagram illustrating a first embodiment of the optical information accessing system according to the present invention.

In FIG. 11, which illustrates a first embodiment of the present invention, the sector mark detection/interpolation circuit 20 of FIG. 1 is modified into a sector mark detection/interpolation circuit 20', and a mask generating circuit 22 is connected to the sector mark detection/interpolation circuit 20'. The mask generating circuit 22 receives the non-masked sector mark interpolation signal $S_7$ and generates a sector mark detection signal masking signal $S_9$ for masking the sector mark detection signal $S_4$.

Figure 12:
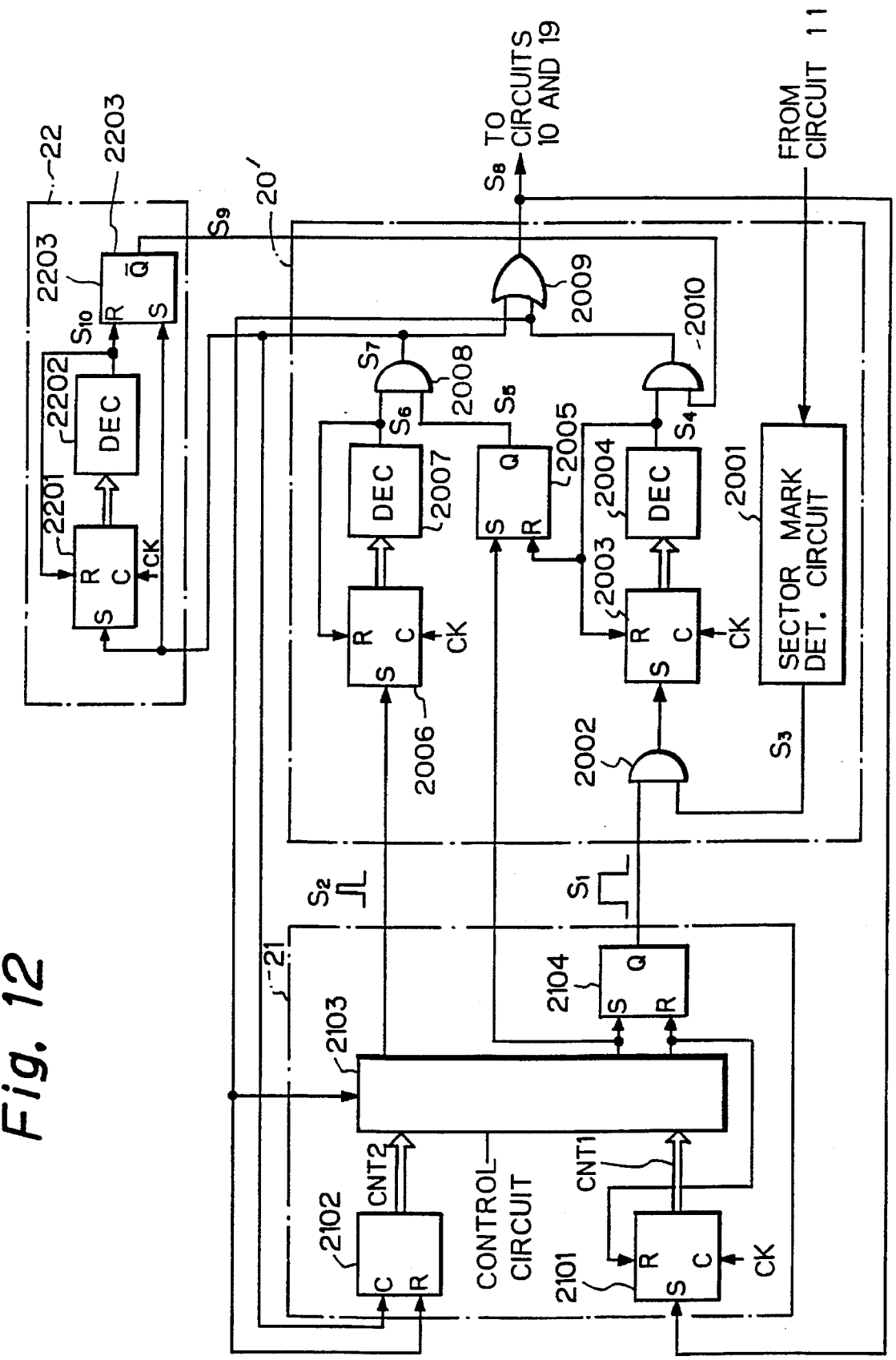
FIG. 12 is a block circuit diagram of the sector mark detection/interpolation circuit and the window/window center generating circuit of FIG. 11.

The sector mark detection/interpolation circuit 20' and the mask generating circuit 22 of FIG. 11 are illustrated in detail in FIG. 12. That is, a validating/invalidating circuit which includes an AND circuit 2010 is provided between the decoder 2004 and the OR circuit 2009 of the sector mark detection/interpolation circuit 20 of FIG. 5. The OR circuit 2009 serving as a sector initiation signal generating circuit. Also, the mask generating circuit 22 includes a counter 2201 and a decoder 2202 serving as a delay circuit having a delay time D3, and a flip-flop 2203. Therefore, every time the non-masked sector mark interpolation signal $S_7$ is generated, the flip-flop 2203 is set. Then, after the time D3 has passed, the flip-flop 2203 is reset, thus generating the sector mark detection signal masking signal $S_9$ having the time D3.

Referring to FIGS. 13A through 13H, every time the sector mark interpolation signal $S_7$ is generated (see FIG. 13E), the masking signal $S_9$ is made low for the definite time D3. As a result, in a full open state due to the three successive occurrences of the sector mark interpolation signal $S_7$, even when the sector mark detection signal $S_4$ is generated, this signal $S_4$ is masked by the masking signal $S_9$, so that the signal $S_4$ does not constitute the sector mark detection/interpolation signal $S_8$ (see FIG. 13H).

Thus, in the first embodiment, one sector mark detection/interpolation signal $S_8$ is generated for each sector.

The first embodiment can be applied to a zone format. That is, in a zone format, the tracks are divided into a plurality of regions, and the number of sectors is changed in accordance with the regions. For example, inner side tracks 0 to 10 belong to zone 0, and outer side tracks 11 to 20 belong to zone 1. Also, the number of sectors per one track within zone 0 is 17, and the number of sectors per one track within zone 1 is 34, thus increasing the storage capacity of the optical disk 1. Here, it is assumed that, when processing one track in zone 1, another track in zone 1 is expected to be seeked by its ID information; however, a track in zone 0 is actually seeked. In this case, the interval of sectors is larger in zone 0 than in zone 1.

Referring to FIGS. 15A through 15G and FIGS. 16A through 16G, after seeking of sector 16 of zone 1 and sector 0 of zone 0, the generation of the sector mark detection signal $S_4$ is switched to that of the sector mark interpolation signal $S_7$ at sector 1 of zone 0, due to the difference in sector interval between zone 1 and zone 0 (see FIGS. 15D and 15E). Then, after the three successive sector mark interpolation signals $S_7$ are generated (see FIG. 15E), the window signal $S_1$ is made active to enter a full open state for each of sectors 2, 3, 4, . . . of zone 0 (see FIGS. 15A and 16A), and as a result, the sector mark detection signal $S_4$ is generated for each of sectors 2, 3, 4, . . . of zone 0 (see FIG. 16D). However, the sector mark detection signal $S_4$ for each of sectors 2, 3, 4, . . . of zone 0 is masked by the masking signal $S_9$ (see FIG. 16F), so that the non-masked sector mark interpolation signal $S_7$ becomes the sector mark detection/interpolation signal $S_8$ (see FIGS. 16E and 16G).

Figure 5:
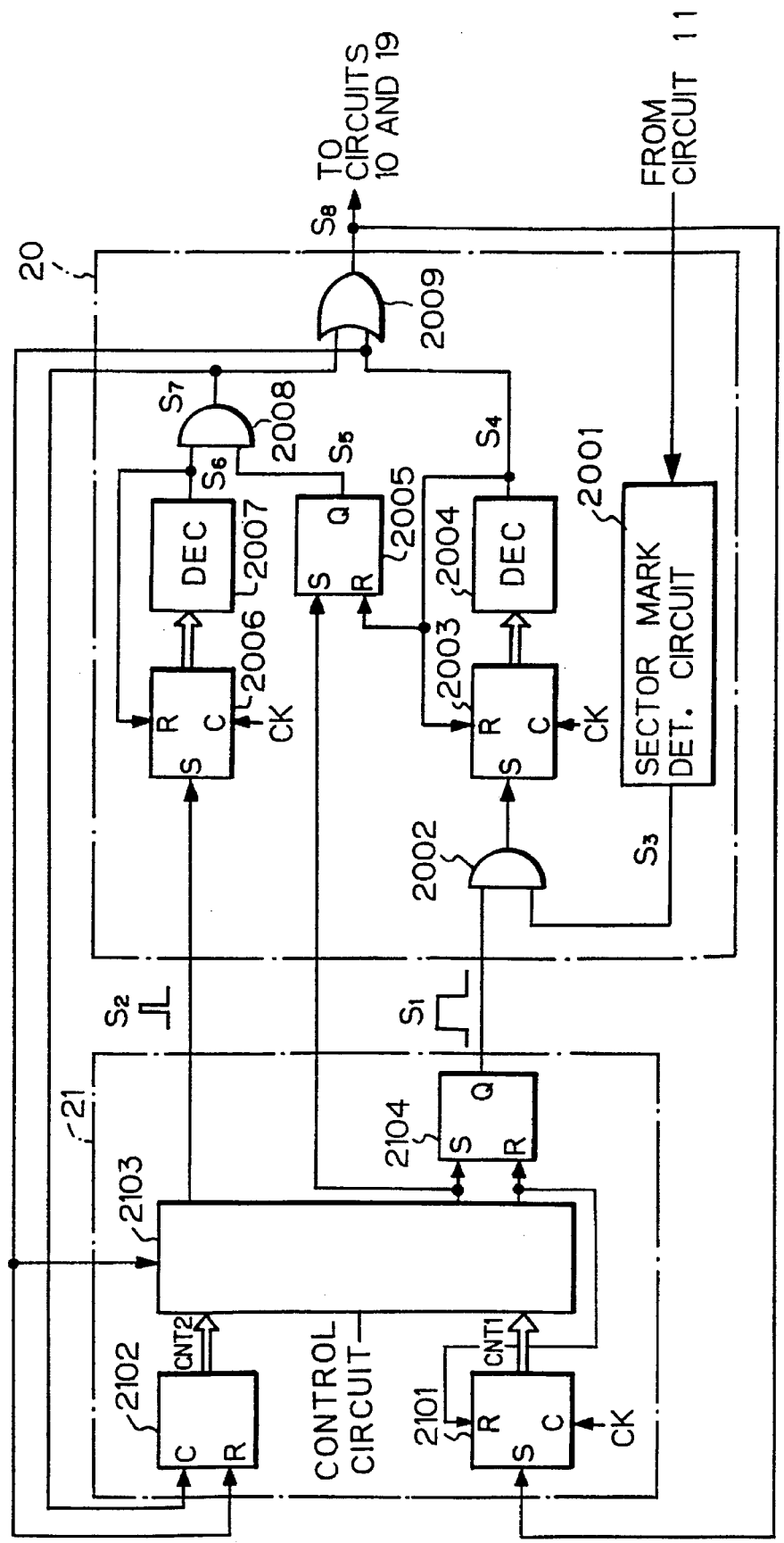
FIG. 5 is a block circuit diagram of the sector mark detection/interpolation circuit and the window/window center generating circuit of FIG. 1.
Figure 17:
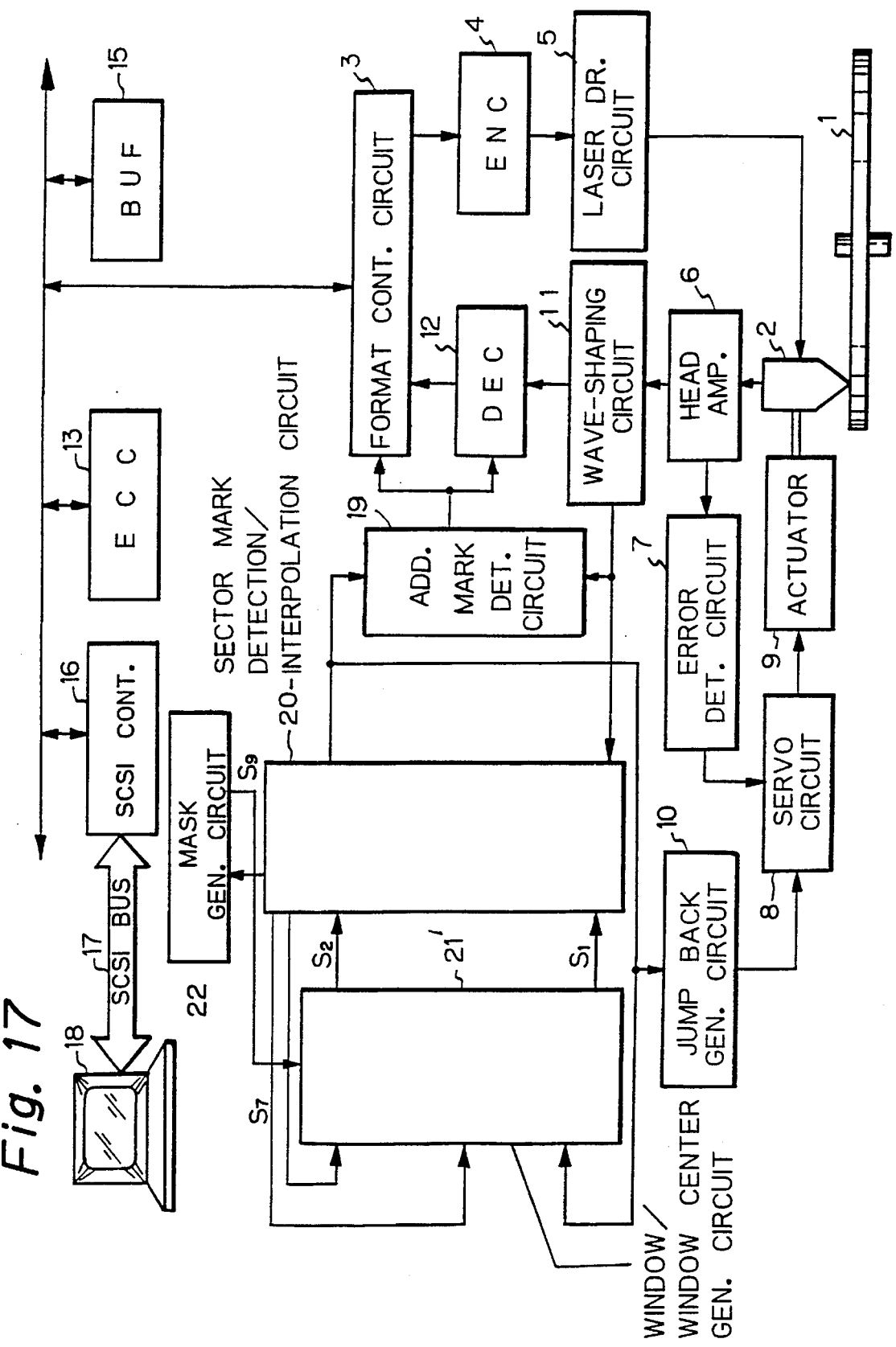
FIG. 17 is a block diagram illustrating a second embodiment of the optical information accessing system according to the present invention.

In FIG. 17, which illustrates a second embodiment of the present invention, the masking signal $S_9$ of the mask generating circuit 22 of FIG. 11 is supplied to the control circuit 2103 of a window/window center generating circuit 21' modified from the window/window center generating circuit 21 of FIG. 5 or 11. In this case, the sector mark detection/interpolation circuit 20' of FIG. 11 is replaced by the sector mark detection/interpolation circuit 20 of FIG. 1. The circuits 20, 21' and 22 are illustrated in detail in FIG. 18.

Figure 18:
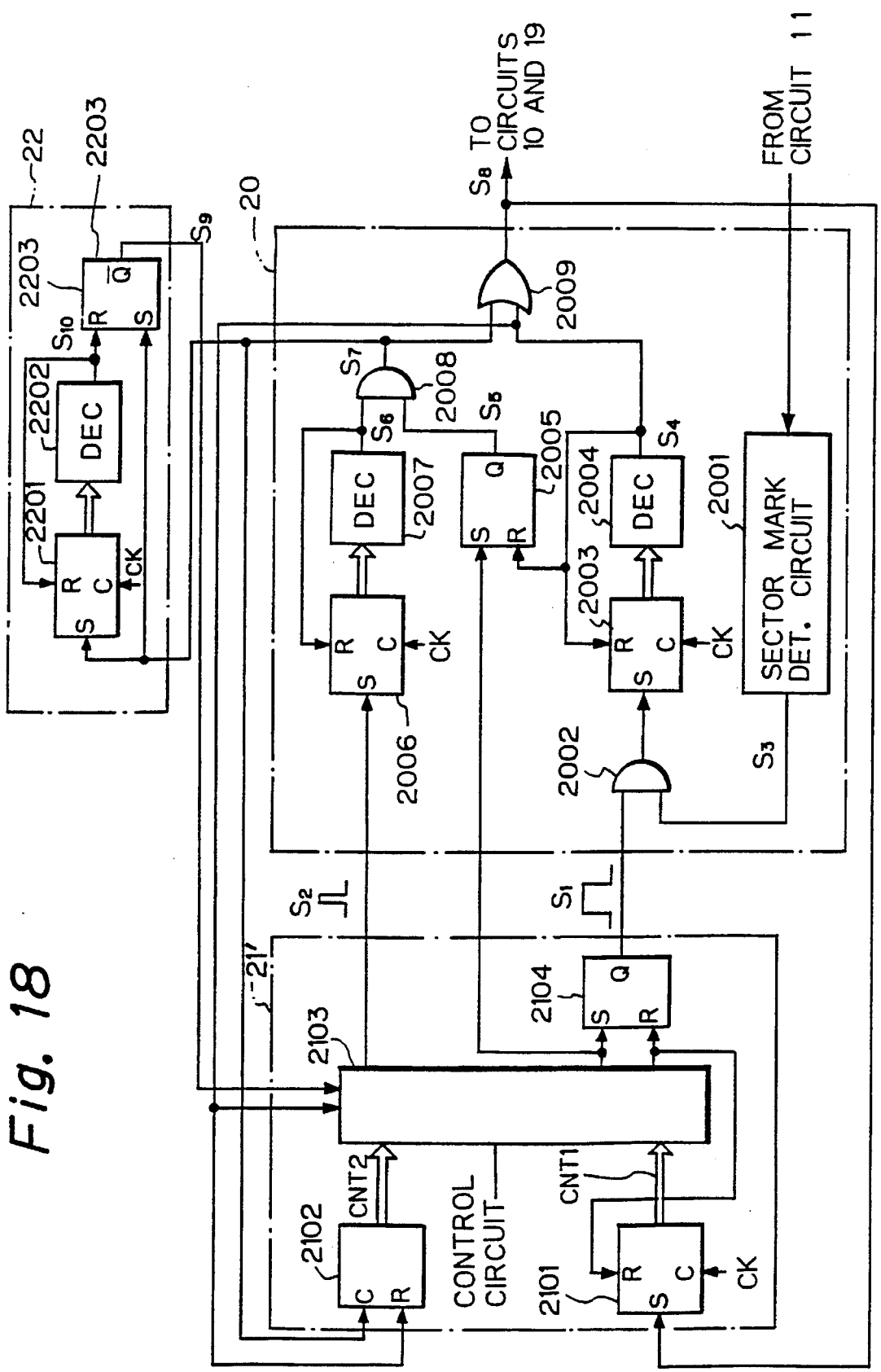
FIG. 18 is a block circuit diagram of the sector mark detection/interpolation circuit and the window/window center generating circuit of FIG. 17.

The operation of the control circuit 2103 of FIG. 18 will be explained next with reference to FIG. 19 and FIGS. 20A through 20H.

Figure 8:
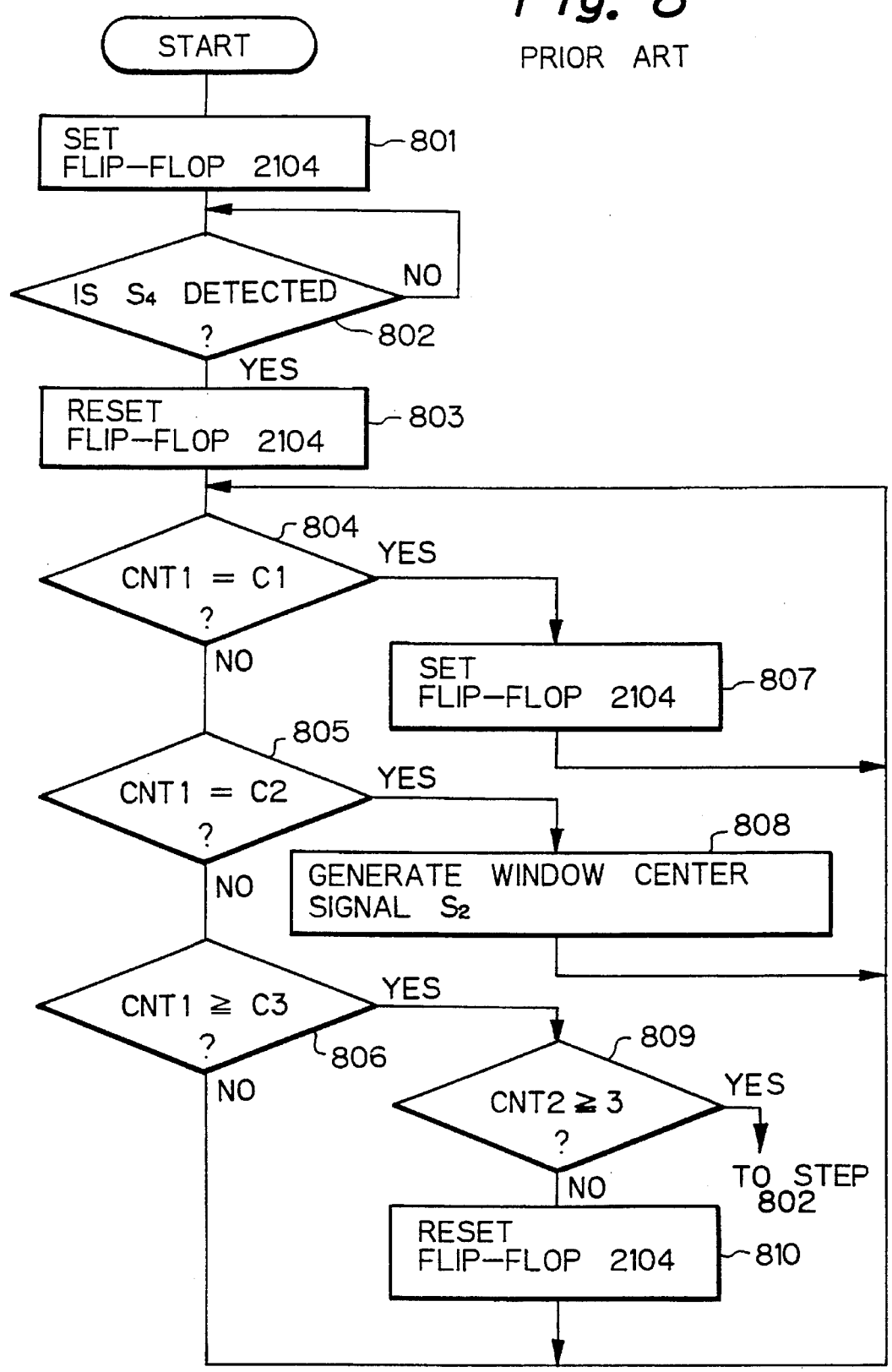
FIG. 8 is a flowchart showing the operation of the control circuit of FIG. 5.
Figure 19:
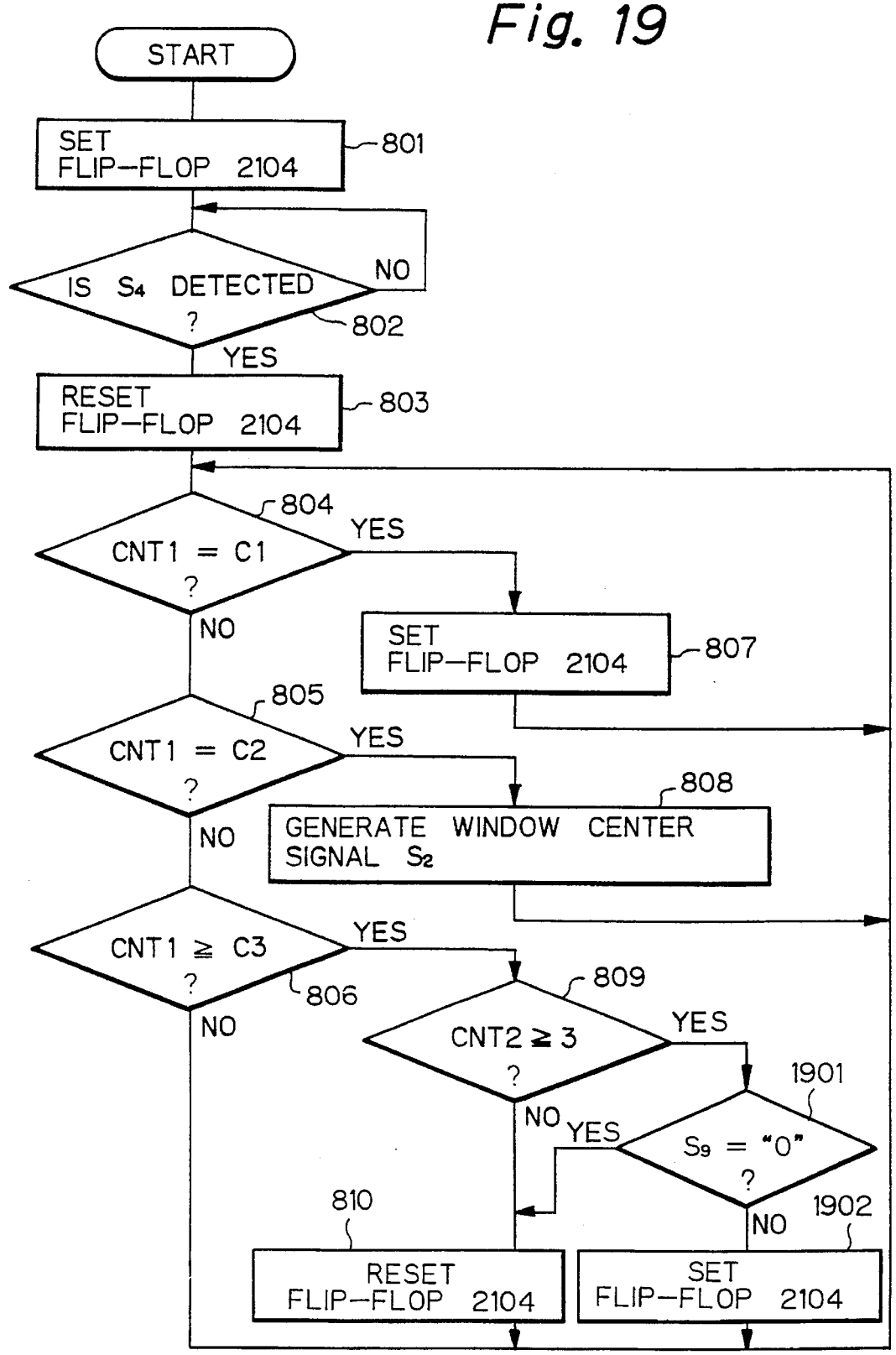
FIG. 19 is a flowchart showing the operation of the control circuit of FIG. 18.

In FIG. 19, steps 1901 and 1902 are added to the routine of FIG. 8. That is, at step 809, if CNT2$\geq$3, the control proceeds to step 1901, where it is determined whether or not the masking signal $S_9$ of the mask generating circuit 22 is "0". As a result, if $S_9$="0" the control proceeds to step 810 which resets the flip-flop 2104, while if $S_9$="1", the control proceeds to step 1902 which sets the flip-flop 2104. That is, even after the generation of three successive non-masked sector mark interpolation signals $S_7$, the window signal $S_4$ is inactive, so that the sector mark detection signal $S_4$ is not generated for sector 12 (see FIG. 20D). Then, after the definite time D3 has passed, the control at step 1901 proceeds to step 1902, thus entering a full open state (see FIG. 20B).

Thus, also, in the second embodiment, one sector mark detection/interpolation signal $S_8$ is generated for one sector.

The second embodiment can also be applied to a zone format in the same way as in the first embodiment.

Referring to FIGS. 22A through 22G and FIGS. 23A through 24G, after seeking of sector 16 of zone 1 and sector 0 of zone 0, the generation of the sector mark detection signal $S_4$ is switched to that of the sector mark interpolation signal $S_7$ at sector 1 of zone 0, due to the difference in sector interval between zone 1 and zone 0 (see FIGS. 22D and 22E). Then, even after the three successive sector mark interpolation signals $S_7$ are generated (see FIG. 22E), the window signal $S_1$ is made inactive for sector 2 of zone 0, so that the sector mark detection signal $S_4$ is not generated for sector 2 of zone 0 (see FIG. 22D). After that, when the masking signal $S_9$ is changed from low to high, the generation of the next sector mark detection signal $S_4$ is awaited (see FIGS. 22G and 23G). Then, when a sector mark detection signal $S_4$ is generated for sector 4 of zone 0, this signal $S_4$ becomes the sector mark detection/interpolation signal $S_8$ (see FIGS. 23D and 23G).

As explained hereinbefore, according to the present invention, one sector mark detection/interpolation signal as a reading reference signal can be generated for each sector. As a result, for example, in a zone format optical disk, a read operation between two zones can be surely carried out.

We claim:

1. An optical information accessing system for an optical disk including a plurality of sectors each having a sector mark, comprising:

a sector mark detecting means for detecting a sector mark from read data of said optical disk;

a sector mark detection signal generating means, connected to said sector mark detecting means, for generating a sector mark detection signal;

a sector mark interpolation signal generating means for generating a sector mark interpolation signal;

a sector mark interpolation signal masking means, connected to said sector mark detection signal generating means and said sector mark interpolation signal generating means, for masking said sector mark interpolation signal when said sector mark detection signal is generated and for generating an unmasked sector mark interpolation signal when said sector mark interpolation signal is not generated;

a sector mark detection signal masking signal generating means, connected to said sector mark interpolation signal masking means, for generating a sector mark detection signal masking signal when the un-masked sector mark interpolation signal is generated;

a validating/invalidating means, connected to said sector mark detection signal masking signal generating means for validating and invalidating the sector mark detection signal in accordance with the sector mark detection signal masking signal; and a sector initiation signal generating means, for generating a sector initiation signal in accordance with both of the sector mark detection signal validated by said validating/invalidating means and the un-masked sector mark interpolation signal.

2. A system as set forth in claim 1, wherein said validating/invalidating means is connected between said sector mark detection signal generating means and said sector initiation signal generating means.

3. A system as set forth in claim 1, further comprising:

a window generating means, connected to said sector initiation signal generating means and said sector mark detection signal generating means, for generating a window signal;

said sector mark detection signal generating means generating the sector mark detection signal only when the window signal is active.

4. A system as set forth in claim 3, wherein said window generating means comprises:

a first counter means, connected to said sector initiation signal generating means, for counting a clock signal, said first counter means being reset by the sector initiation signal;

means for determining whether or not a value of said first counter means reaches a first definite value;

means for determining whether or not the value of said first counter means reaches a second definite value larger than the first definite value;

means for activating the window signal when the value of said first counter means reaches the first definite value; and means for deactivating the window signal when the value of said first counter means reaches the second definite value.

5. A system as set forth in claim 3, further comprising:

means for determining whether or not the value of said first counter reaches a third definite value;

means for generating a window center signal and transmitting it to said sector mark interpolation signal generating means, when the value of said first counter means reaches the third value, said sector mark interpolation signal generating means generating the sector mark interpolation signal by delaying the window center signal by a definite time.

6. A system as set forth in claim 2, further comprising:

a first counter means, connected to said sector initiation signal generating means, for counting a clock signal, said first counter means being reset by the sector initiation signal;

means for determining whether or not a value of said first counter means reaches a first definite value;

means for determining whether or not the value of said first counter means reaches a second definite value larger than the first definite value;

means for activating the window signal when the value of said first counter means reaches the first definite value;

means for deactivating the window signal when the value of said first counter means reaches the second definite value;

a second counter means, connected to said sector mark detection signal masking means and said sector mark interpolation signal masking means, for counting a number of the sector mark interpolation signals which have passed through said sector mark detection signal masking means, said second counter means being reset by the sector mark detection signal which has passed through said sector mark detection signal masking means;

means for determining whether or not a value of said second counter means is larger than a fourth definite value; and means for stopping an operation of said window deactivating means when the value of said second counter means is larger than the fourth definite value, said sector mark detection signal generating means generating the sector mark detection signal only when the window signal is active.

7. A system as set forth in claim 1, further comprising:

a first counter means, connected to said sector initiation signal generating means, for counting a clock signal, said first counter means being reset by the sector initiation signal;

means for determining whether or not a value of said first counter means reaches a first definite value;

means for determining whether or not the value of said first counter means reaches a second definite value larger than the first definite value;

means for activating the window signal when the value of said first counter means reaches the first definite value;

a second counter means, connected to said sector mark detection signal masking means and said sector mark interpolation signal masking means, for counting a number of the sector mark interpolation signals which have passed through said sector mark detection signal masking means, said second counter means being reset by the sector mark detection signal which has passed through said sector mark detection signal masking means;

means for determining whether or not a value of said second counter means is larger than a fourth definite value;

means for determining whether or not said validating/invalidating means is receiving the sector mark detection signal masking signal;

means for deactivating the window signal, when the value of said first counter means has reached the second value, when the value of said second counter means is larger than the fourth value and when said validating/invalidating means is receiving the sector mark detection signal masking signal; and means for activating the window signal, when the value of said first counter means has reached the second value, when the value of said second counter means is larger than the fourth value and when said validating/invalidating means is not receiving the sector mark detection signal masking signal.

8. An optical information accessing system for an optical disk including a plurality of sectors each having a sector mark, comprising:

a sector mark detecting means for detecting a sector mark from read data of said optical disk;

a sector mark detection signal generating means, connected to said sector mark detecting means, for generating a sector mark detection signal;

a sector mark interpolation signal generating means for generating a sector mark interpolation signal;

a sector mark interpolation signal masking means, connected to said sector mark detection signal generating means, for masking said sector mark interpolation signal when said sector mark detection signal is generated and for generating an un-masked sector mark interpolation signal when said sector mark interpolation signal is not generated;

a sector mark detection signal masking signal generating means, connected to said sector mark interpolation signal masking means, for generating a sector mark detection signal masking signal when the un-masked sector mark interpolation signal is generated;

a validating/invalidating means, connected to said sector mark detection signal masking signal generating means, connected to said sector mark detection signal generating means and said sector mark detection signal masking means, for validating and invalidating the sector mark detection signal in accordance with the sector mark detection signal masking signal; and a sector initiation signal generating means, for generating a sector initiation signal in accordance with both of the sector mark detection signal validated by said validating/invalidating means and the un-masked sector mark interpolation signal.

9. An optical information accessing system for an optical disk including a plurality of sectors each having a sector mark, comprising:

a sector mark detecting means for detecting a sector mark from read data of said optical disk;

a sector mark detection signal generating means, connected to said sector mark detecting means, for generating a sector mark detection signal;

a sector mark interpolation signal generating means for generating a sector mark interpolation signal;

a sector mark interpolation signal masking means, connected to said sector mark detection signal generating means and said sector mark interpolation signal generating means, for masking said sector mark interpolation signal when said sector mark detection signal is generated and for generating an unmasked sector mark interpolation signal when said sector mark interpolation signal is not generated;

a sector mark detection signal masking signal generating means, connected to said sector mark interpolation signal masking means, for generating a sector mark detection signal masking signal when the un-masked sector mark interpolation signal is generated;

a first counter means, connected to said sector initiation signal generating means, for counting a clock signal, and first counter means being reset by the sector initiation signal;

means for determining whether or not a value of said first counter means reaches a first definite value;

means for determining whether or not the value of said first counter means reaches a second definite value larger than the first definite value;

means for activating the window signal when the value of said first counter means reaches the first definite value;

a second counter means, connected to said sector mark detection signal masking means and said sector mark interpolation signal masking means, for counting a number of the sector mark interpolation signals which have passed through said sector mark detection signal masking means, said second counter means being reset by the sector mark detection signal which has passed through said sector mark detection signal masking means;

means for determining whether or not a value of said second counter means is larger than a fourth definite value;

means for determining whether or not the sector mark detection signal masking signal is generated;

means for deactivating the window signal, when the value of said first counter means has reached the second value, when the value of said second counter means is larger than the fourth value and when the sector mark detection signal masking signal is generated;

means for activating the window signal; when the value of said first counter means has reached the second value, when the value of said second counter means is larger than the fourth value and when the sector mark detection signal masking signal is not generated; and a sector initiation signal generating means, connected to said sector mark detection signal generating means and said sector mark interpolation signal masking means, for generating a sector initiation signal in accordance with both of the sector mark detection signal and the un-masked sector mark interpolation signal.

* * * * *

UNITED STATES PATENT AND TRADEMARK OFFICE
CERTIFICATE OF CORRECTION

PATENT NO.  : 5,563,854
DATED       : October 8, 1996
INVENTOR(S) : Kobunaya et al.

It is certified that error appears in the above-indentified patent and that said Letters Patent is hereby corrected as shown below:

On the title page:

Under item [73], in the Assignee, add --and SONY Corporation, Japan--.

Signed and Sealed this

Twenty-second Day of April, 1997

Attest:

BRUCE LEHMAN

*Commissioner of Patents and Trademarks*

*Attesting Officer*